J. F. CASTÉRAN.
PNEUMATIC TIRE.
APPLICATION FILED SEPT. 26, 1912.
1,059,344.
Patented Apr. 22, 1913.
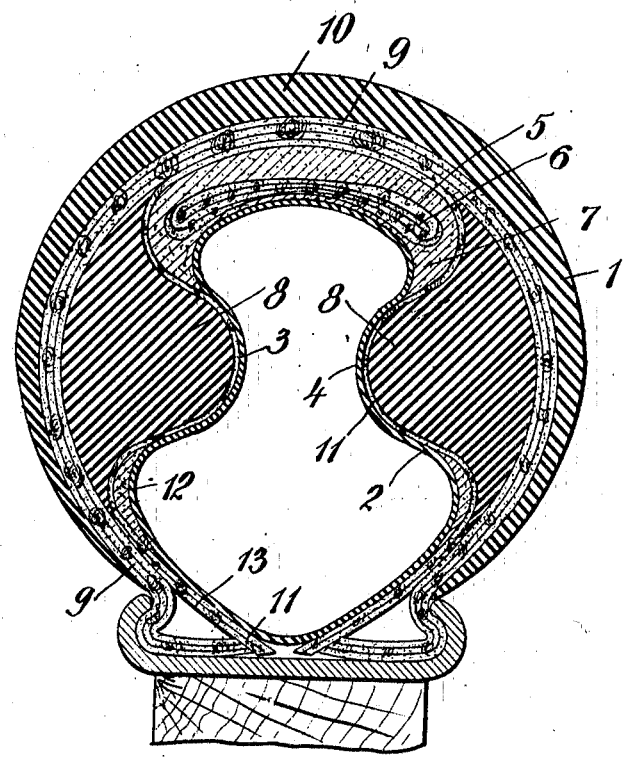
WITNESSES
Gertrude M. Hulet
S. Kraus.
INVENTOR
Jean Frédéric Castéran
BY
Lawrence Languer
ATTORNEY

UNITED STATES PATENT OFFICE.

JEAN FRÉDÉRIC CASTÉRAN, OF ST. GEORGES LES BAINS, CHARMES, FRANCE.

PNEUMATIC TIRE.

1,059,344.   Specification of Letters Patent.   Patented Apr. 22, 1913.

Application filed September 26, 1912. Serial No. 722,475.

*To all whom it may concern:*

Be it known that I, JEAN FRÉDÉRIC CASTÉRAN, a citizen of the Republic of France, residing at St. Georges les Bains, Charmes, Ardéche, France, have invented certain new and useful Improvements in Pnuematic Tires, of which the following is a specification.

This invention relates to improvements in pneumatic tires for automobiles, bicycles and the like, and has for its object to provide a pneumatic tire which shall be substantially non-puncturable without losing any of the desirable effects which are characteristic of a pneumatic tire.

The drawing illustrates in section a preferred embodiment of my invention.

In said drawing, 1 is the outer cover and 2 is the inner tube. It will be seen that the inner tube has its lateral walls depressed inwardly at 3 and 4 so that it forms, so to speak, two annular chambers connected by a portion of relatively narrow cross-section, which shape I refer to hereinafter as a substantially 8-shape formation. Above the outer periphery of the inner tube 2 I provide a protecting member or sheath 5, which is preferably made up of a number of leather sheets 6 superposed as shown, and which constitutes an efficient protecting means strong enough to prevent the penetration of any articles such as nails or the like into the inner tube 2. At the same time this protector will not interfere with the resilient action of the pneumatic tire, not only owing to its inherent flexibility, but also owing to the manner in which it is arranged in relation to the other parts of the tire. I preferably form this protector with its end portions somewhat wider than its central portion, as I find that this increases its flexibility. In order to reduce friction which may be caused under stresses set up in running, I may incase said protector 5 in filling material or padding 7, such as cotton waste or any other suitable material, and this padding assists in protecting the tire against puncture by acting as an additional peripheral protecting means. In this way I protect the outer periphery of the inner tube against puncture without in any way interfering with the resilient properties of the tire.

The outer cover is preferably designed to maintain the shape of the inner tube, and to protect it from puncture by nails or the like entering the tire sidewise. In the embodiment shown in the drawing I provide the inner face of the outer cover with projections 8 made of rubber or any other suitable material, although I prefer to make these projections of rubber so that they may add to the resiliency of the tire as a whole. While these projections are herein described and illustrated as forming part of the inner surface of the outer cover, yet it will be understood that they might be made separate if desired.

In the preferred form of outer cover shown in the drawing the usual strips 9 of canvas or like material are cemented to the tread 10 in the usual manner, and the projections 8 are vulcanized or otherwise connected to the innermost canvas strip 9. An additional strip 11 of canvas or the like is passed around the outer face of said projections 8 and connected thereto, and this strip 11 is also connected with the innermost canvas strip 9 along the curved peripheral face of said strip as shown. Strips or layers 12 of cotton waste or other suitable padding material are interposed between the inner tube 3 and the projections 8 at the lower ends of said projections in order to reduce friction between these parts during running.

I find it desirable to reinforce the outer cover at its lower ends and I may do this in any suitable manner, but preferably by interposing one or more additional strips of canvas or the like, such as the strip 13, this strip being interposed between the strip 11 and the innermost strip 9. This reinforcement will be found sufficient in practice to counteract any strains which may possibly be set up at these points.

In operation the projections 8 maintain the special shape of the inner tube and also serve as means for protecting the tire against puncture by objects entering the tire laterally. It will be noted that, owing to the formation of the inner surfaces of the projections 8, no damaging stresses are brought to bear upon the inner tube, so that there is no danger of said projections cutting into or injuriously rubbing against the inner tube. Furthermore it will be noted that the ends of the leather protector 5 are located in such position that they do not dig into the inner tube, but will bear against the projections 8 through the interposed padding material. They also serve as supports for the protecting means and prevent these means from cutting through the tire. Owing to the special formation of the tire as herein described and shown in the drawing, I have found, from actual experience, that should the inner tube be deflated for any reason, as by leakage through the valve, or in the highly improbable event of a puncture, the tire can run as a resilient shock absorber without in any way injuring the outer cover and the inner tube. Thus, if the tire is punctured on the road, the driver of the car can run his machine to its destination not only without any damage to the tire, but also without transmitting the road vibration to the vehicle. This would be manifestly impossible with an ordinary pneumatic tire, which would be cut to pieces were the automobile to be run with the inner tube in deflated condition.

While I have described my invention herein with reference to a preferred embodiment thereof, I wish it to be clearly understood that my invention is by no means limited to the construction herein described and shown, as numerous changes in the form and construction of the tire will be apparent to those skilled in the art and can be made without departing from the scope of my invention, as pointed out in the claims which follow, and I also wish it to be understood that I intend these claims to be construed as generic in the widest sense.

Having now described my invention, what I claim is:

1. An outer cover for a pneumatic tire comprising internal laterally disposed resilient members forming inwardly arched surfaces, and an outwardly arched protecting device bearing against and bridging said laterally disposed members.

2. An outer cover for a pneumatic tire comprising an arched protecting member concentric with the tire and having its ends curved substantially toward the base of the cover, and lateral abutments disposed on each side of the outer cover adapted to depress the lateral walls of an inner tube, said protecting member bearing against said abutments.

3. An outer cover for a pneumatic tire comprising lateral resilient abutments defining a portion of a chamber of substantially 8-shape cross-sectional formation, and a protecting member whose sides bear substantially perpendicularly against said abutments defining the remaining portion of said chamber.

4. A pneumatic tire of the kind described, comprising an outer cover, laterally disposed members associated with said outer cover for depressing the inner tube to cause said inner tube to assume a substantially 8-shape cross-sectional formation, and protecting means resting upon and bearing against said laterally disposed members.

In testimony whereof I affix my signature in presence of two witnesses.

JEAN FRÉDÉRIC CASTÉRAN.

Witnesses:
E. T. MADDEN,
W. H. CARD.

---

Copies of this patent may be obtained for five cents each, by addressing the "Commissioner of Patents, Washington, D. C."